(12) United States Patent
Vedeshwar et al.

(10) Patent No.: US 11,849,043 B2
(45) Date of Patent: Dec. 19, 2023

(54) ZERO-KNOWLEDGE AUTHENTICATION BASED ON DEVICE INFORMATION

(71) Applicant: SONY GROUP CORPORATION, Tokyo (JP)

(72) Inventors: Priyanka Savitkumar Vedeshwar, Bangalore (IN); Vittal K Biradar, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 157 days.

(21) Appl. No.: 17/097,795

(22) Filed: Nov. 13, 2020

(65) Prior Publication Data
US 2022/0158835 A1    May 19, 2022

(51) Int. Cl.
*H04L 9/32* (2006.01)
*H04L 9/08* (2006.01)
*H04L 9/30* (2006.01)

(52) U.S. Cl.
CPC .......... *H04L 9/3218* (2013.01); *H04L 9/0866* (2013.01); *H04L 9/3073* (2013.01); *H04L 9/3242* (2013.01)

(58) Field of Classification Search
None
See application file for complete search history.

(56) References Cited

U.S. PATENT DOCUMENTS 7,832,002 B2    11/2010   Chevreau et al.
8,605,898 B2 *  12/2013   Jin ........................ H04L 9/3218
                                                            380/46

(Continued)

FOREIGN PATENT DOCUMENTS

CN    110991655       *  4/2020
WO    WO-2015088319 A1 *  6/2015   ............. H04L 9/085

OTHER PUBLICATIONS

M. Portnoi and C.-C. Shen, "Location-enhanced authenticated key exchange," 2016 International Conference on Computing, Networking and Communications (ICNC), 2016, pp. 1-5, doi: 10.1109/ICCNC.2016.7440584. (Year: 2016).*

(Continued)

*Primary Examiner* — Saleh Najjar
*Assistant Examiner* — Shadi H Kobrosli
(74) *Attorney, Agent, or Firm* — CHIP LAW GROUP

(57) ABSTRACT

An electronic device generates a first key pair associated with the electronic device. A first secret key of the first key pair is generated based on device properties including identification information of the electronic device. The electronic device transmits a communication request to a verifier device. The electronic device generates zero-knowledge information which is based on the generated first secret key. A first public key of the first key pair is stored in the verifier device. The electronic device transmits the zero-knowledge information to the verifier device for a verification of the transmitted communication request. The verification of the communication request is based on the first public key. The electronic device receives verification information from the verifier device based on the transmitted zero-knowledge information and a successful verification of the verification of the transmitted communication request. The electronic device communicates with the verifier device based on the received verification information.

19 Claims, 7 Drawing Sheets

(56) References Cited

U.S. PATENT DOCUMENTS

| | | | | |
|---|---|---|---|---|
| 9,215,076 | B1* | 12/2015 | Roth | H04L 9/3247 |
| 9,762,556 | B2 | 9/2017 | James et al. | |
| 10,685,350 | B2* | 6/2020 | Osborn | H04L 9/3234 |
| 2003/0115464 | A1* | 6/2003 | Nyang | H04L 9/0844 713/171 |
| 2007/0003061 | A1 | 1/2007 | Jung et al. | |
| 2010/0172503 | A1* | 7/2010 | Neumann | H04L 9/3234 380/282 |
| 2010/0205443 | A1* | 8/2010 | Zhao | H04L 9/0841 713/171 |
| 2011/0055568 | A1* | 3/2011 | Farrugia | H04L 63/0428 713/170 |
| 2011/0202767 | A1* | 8/2011 | Hui | H04L 9/321 713/168 |
| 2013/0198518 | A1* | 8/2013 | Ran | H04L 63/08 713/170 |
| 2017/0141925 | A1* | 5/2017 | Camenisch | H04W 12/10 |
| 2018/0123794 | A1* | 5/2018 | Goranov | H04L 9/30 |
| 2019/0268156 | A1* | 8/2019 | Delmas | G06F 21/31 |
| 2020/0092090 | A1* | 3/2020 | Lin | H04L 9/30 |
| 2022/0021537 | A1* | 1/2022 | Wagner | H04L 9/3213 |
| 2022/0029824 | A1* | 1/2022 | Poeppelmann | H04L 9/3093 |
| 2022/0109573 | A1* | 4/2022 | Ceravolo | H04L 9/3218 |

OTHER PUBLICATIONS

P. L. S. Kumari and A. Damodaram, "An Alternative Methodology for Authentication and Confidentiality Based on Zero Knowledge Protocols Using Diffie-Hellman Key Exchange," 2014 International Conference on Information Technology, 2014, pp. 368-373, doi: 10.1109/ICIT.2014.39. (Year: 2014).*

Portnoi, Marcos & Shen, Chien-Chung. (2016). Location-Enhanced Authenticated Key Exchange. pp. 1-6 (Year: 2016).*

Udgata, et al., "Wireless Sensor Network Security model using Zero Knowledge Protocol", IEEE International Conference on Communications (ICC), Jul. 29, 2011, 05 pages.

* cited by examiner

ZERO-KNOWLEDGE AUTHENTICATION BASED ON DEVICE INFORMATION

CROSS-REFERENCE TO RELATED APPLICATIONS/INCORPORATION BY REFERENCE

None.

FIELD

Various embodiments of the disclosure relate to authentication. More specifically, various embodiments of the disclosure relate to an electronic device and method for zero-knowledge authentication based on device information.

BACKGROUND

In conventional device-to-device (D2D) communication systems, authentication may be required for a secure communication between two or more devices. The authentication may further be required to prevent unauthorized access of the devices by a miscreant. Typically, the authentication may be based on password for the secure communication between the two or more devices. In certain situations, the password shared between the devices may be interpreted by fraudulent parties, which may risk the secured communication and may lead to illicit forging of the devices. Further, in certain devices (such as a camera) which possess a limited display screen space, it may be difficult for a user to provide the passwords as well.

In certain situations, the password or authentication-based tokens may be pre-stored on a third-party system such as a server, which may facilitate the secured authentication between the two or more devices. However, such password or authentication-based tokens stored on the server may be maliciously accessed and misused by the miscreant. Further, in certain unavoidable conditions (such as network failure or downtimes), the authentication performed between the multiple devices via the intermediate server, may also be affected. Therefore, there is a need of an enhanced system which may provide password-less authentication between the two devices, without relying on any intermediate server.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for zero-knowledge authentication based on device information, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
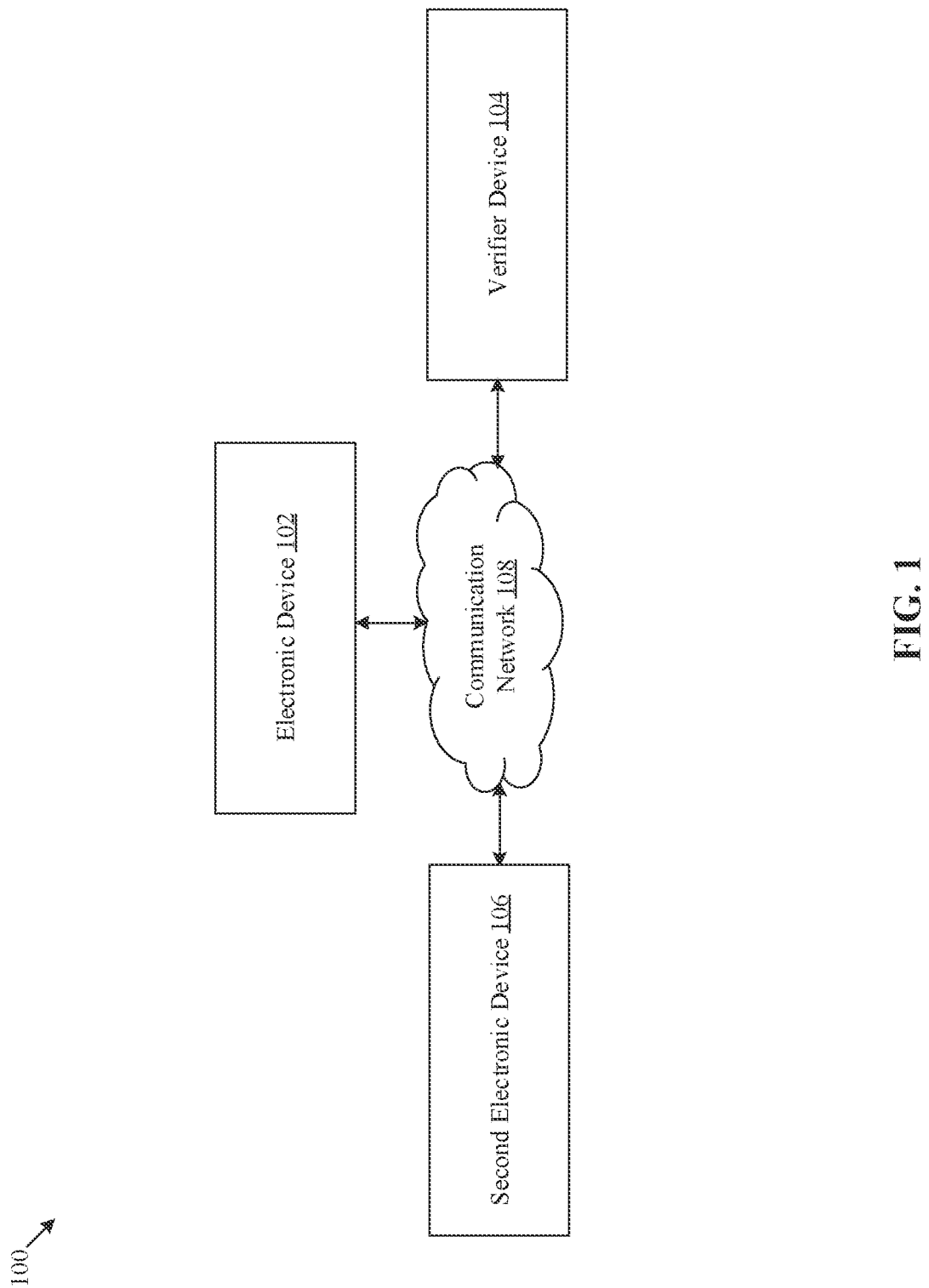
FIG. 1 is a diagram of an exemplary network environment for zero-knowledge authentication based on device information, in accordance with an embodiment of the disclosure.

The following described implementations may be found in the disclosed electronic device and method for zero-knowledge authentication based on device information. The disclosed electronic device may generate a key pair that may include a secret key and a public key associated with the electronic device. The electronic device may further generate zero-knowledge information based on the secret key and utilize the generated zero-knowledge information (i.e. without revealing a secret key or password directly) for a secure communication with another device (such as a verifier device). The zero-knowledge information may be based on a cryptographic zero-knowledge proof shared between the electronic device and a verifier device for establishment of the secure communication between the electronic device and the verifier device.

Exemplary aspects of the disclosure provide an electronic device for the zero-knowledge authentication. The electronic device (such as a phone) may generate a first key pair (such as a cryptographic key pair) associated with the electronic device. The first key pair may include a first secret key and a first public key associated with the electronic device. The first secret key of the first key pair may be generated based on one or more device properties including identification information (such as the device information) of the electronic device. The first public key may be generated based on the first secret key. In one or more embodiments, the first secret key may be generated based on time information (i.e. timestamp) and location information related to the electronic device, thereby generating a unique first secret key. The electronic device may transmit a communication request to a verifier device (such as a digital camera). The communication request may correspond to a request for communication between the electronic device and the verifier device. For example, the communication request may be transmitted by the electronic device to the verifier device to access one or more files (such as videos or images) stored in the verifier device. The electronic device may further generate zero-knowledge information for the authentication of the electronic device. In some embodiments, a different zero-knowledge information may be generated each time for a communication between the electronic device and the verifier device.

In accordance with an embodiment, zero-knowledge information may be generated based on the first secret key of the first key pair and other random parameters (such as a first set of randomized parameters) associated with the electronic device. Moreover, the first public key of the electronic device may be transmitted to and stored in the verifier device before transmission of the communication request. The electronic device may further transmit the zero-knowledge information to the verifier device for a verification of the transmitted communication request. The verification of the transmitted communication request may be based on the first public key, associated with the electronic device and stored in the verifier device. The transmitted zero-knowledge information may be independent of sensitive information (such as the first secret key of the first key pair or any other password) associated with the electronic device. Therefore, any third party (such as an eavesdropper), which may have a malicious intent, may be unable to misuse the zero-knowledge information for unauthorized access of the verifier device without having the first secret key.

Furthermore, the electronic device may receive verification information from the verifier device based on the transmitted zero-knowledge information and a successful verification by the verification of the transmitted communication request. The verification information may be based on a recovery of the first public key (i.e. generated based on the first secret key) from the transmitted zero-knowledge information. The successful recovery of the first public key from the zero-knowledge information may provide successful verification of the transmitted communication request. In other words, the electronic device may be validated for a communication with the verifier device based on the successful verification. The electronic device may further communicate with the verifier device based on the received verification information, without use of input of a password. Thus, the electronic device may provide a password-less authentication.

In an exemplary scenario, the first public key stored in the verification device may be disabled and removed from the verifier device in case the electronic device may be lost. Thus, an unauthorized communication between the electronic device and the verifier device may be avoided, that further prevents illicit forging of the electronic device.

The disclosed electronic device may generate the first secret key based on the one or more device properties, the time information and the location information of the electronic device. Moreover, the first public key may be generated based on the first secret key, as opposed to conventional keys that may be randomly generated. The generated first key pair may be a unique key pair that may depend on the properties of the electronic device, time of the generation of the first key pair and the location of the generation of the first key pair. Thus, retrieval of the generated key pair by a third party may be difficult. Moreover, the electronic device may generate zero-knowledge information each time a new communication request may be transmitted to the verifier device. The zero-knowledge information may expire after being transmitted and verified by the verifier device. As the transmitted zero-knowledge information expires after the transmission and excludes the first secret key, no third party may be able to misuse the zero-knowledge information even when the third-party gains access to the zero-knowledge information. Moreover, no sensitive data (such as the first secret key or the unique identity of the electronic device) is shared with the verifier device. Thus, privacy of the electronic device may be preserved. Further, the sensitive data (i.e. zero zero-knowledge information or the first secret key or any other authentication password) may not be shared with any third-party systems or servers, in contrast to conventional systems that used to store the password or any authentication token for the devices. Thus, the disclosed electronic device provides password-less authentication for the secure communication of the electronic device with the verifier device, without any requirement of intermediate server to store passwords or token for authentications.

FIG. 1 is a diagram of an exemplary network environment for zero-knowledge authentication based on device information, in accordance with an embodiment of the disclosure. With reference to FIG. 1, there is shown a block diagram of a network environment 100. The network environment 100 may include an electronic device 102, a verifier device 104, and a second electronic device 106. The network environment 100 may further include a communication network 108. The electronic device 102 and the second electronic device 106 may communicate with the verifier device 104 via the communication network 108.

The electronic device 102 may include suitable logic, circuitry, and interfaces that may be configured to generate the first key pair that may include the first secret key and the first public key. The electronic device 102 may be further configured to generate zero-knowledge information and transmit the zero-knowledge information to the verifier device 104 for authentication, and receive the verification information from the verifier device 104. Examples of the electronic device 102 may include, but are not limited to, a computing device, a smartphone, a cellular phone, a mobile phone, a gaming device, a mainframe machine, a server, an internet of things (IoT) device, a computer work-station, a laptop, an imaging device, and/or a consumer electronic (CE) device.

The verifier device 104 may include suitable logic, circuitry, and interfaces that may be configured to receive the zero-knowledge information from the electronic device 102 for authentication and generate the verification information based on the received zero-knowledge information. The verifier device 104 may be further configured to transmit the generated verification information to the electronic device 102 for the communication between the verifier device 104 and the electronic device 102. Examples of the verifier device 104 may include, but are not limited to, an imaging device, a camera, a computing device, a smartphone, a cellular phone, a mobile phone, a storage device, a memory device, a gaming device, a mainframe machine, a server, an IoT device, a computer work-station, and/or a consumer electronic device.

The second electronic device 106 may include suitable logic, circuitry, and interfaces that may be configured to transmit a disable command to the verifier device 104 for a disablement of the first public key stored in the verifier device 104. The second electronic device 106 may be further configured to transmit a third public key of a third key pair associated with the second electronic device 106, for a setup of communication between the second electronic device 106 and the verifier device 104. In some embodiments, the second electronic device 106 may transmit the disable command and the third public key to the verifier device 104 via a wired connection (for example, a universal serial bus (USB) cable). Examples of the second electronic device 106 may include, but are not limited to, an imaging device, a computing device, a smartphone, a cellular phone, a mobile phone, a gaming device, a mainframe machine, a server, a computer work-station, laptop, an IoT device, and/or a consumer electronic device.

The communication network 108 may include a communication medium through which the electronic device 102, the verifier device 104 and the second electronic device 106 may communicate with each other. The communication network 108 may be one of a wired connection or a wireless connection. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may receive inputs (from example user inputs) to communicate with the verifier device 104, for example, to access files or content stored on the verifier device 104 or transfer files/content to the verifier device 104. The electronic device 102 may be configured to generate the first key pair that may include the generation of the first secret key (based on the device properties, the time information and the location information) and the first public key. In one or more embodiments, the electronic device 102 may transmit the generated first public key to the verifier device 104 and may receive a second public key from the verifier device 104 for completion of a setup of communication between the electronic device 102 and the verifier device 104. Details of the generation of the first key pair by the electronic device 102 are further provided, for example, in FIG. 3A.

The electronic device 102 may be configured to transmit a communication request to the verifier device 104. The communication request may correspond to a request for communication between the electronic device 102 and the verifier device 104. In some embodiments, the communication request may be transmitted by use of an application installed on the electronic device 102 for the communication between the electronic device 102 and the verifier device 104. Details of the transmission of the communication request by the electronic device 102 are further provided, for example, in FIG. 3A.

The electronic device 102 may be further configured to generate the zero-knowledge information based on the first secret key of the first key pair (such as a first key pair 204A shown in FIG. 2) generated by the electronic device 102. The first public key of the first key pair 204A may be stored in the verifier device 104. In some embodiments, the zero-knowledge information may be generated based on the generated first secret key, a first set of randomized parameters and first hash information generated by the electronic device 102. Details of the generation of the zero-knowledge information is further provided, for example, in FIG. 3A-3B.

The electronic device 102 may be further configured to transmit the generated zero-knowledge information to the verifier device 104. The generated zero-knowledge information may be transmitted to the verifier device 104 for a verification of the transmitted communication request. The verification of the transmitted communication request may be based on the first public key associated with the electronic device 102 and stored in the verifier device 104. Details of the transmission of the generated zero-knowledge information are further provided, for example, in FIG. 3B.

In accordance with an embodiment, the verifier device 104 may be configured to receive the zero-knowledge information. The verifier device 104 may further generate verification information based on the received zero-knowledge information and a successful verification of the verification of the communication request received from the electronic device 102. The verifier device 104 may generate second hash information based on the stored first public key and the first set of randomized parameters received in the zero-knowledge information. The verifier device 104 may generate the verification information based on a comparison of the first hash information received from the electronic device 102 and the generated second hash information. In some embodiments, the generation of the verification information may indicate that the received first hash information and the generated second hash information are same. Details of the generation of the verification information are further provided, for example, in FIG. 3B.

The electronic device 102 may be further configured to receive the verification information from the verifier device 104 based on the transmitted zero-knowledge information and the successful verification of the verification of the transmitted communication request. The electronic device 102 may further perform communication (for example to access files or content) with the verifier device 104 based on the received verification information. Details of the receipt of the verification information and the communication with the verifier device 104 are further provided, for example, in FIG. 3B.

In an exemplary scenario, the electronic device 102 may be misplaced or lost. Therefore, in order to avoid misuse of sensitive information (for example, personal files) stored in the verifier device 104, the first public key stored in the verifier device 104 may be disabled. The disablement of the first public key from the verifier device 104 may prohibit the communication (for example, communication initiated by a user with malicious intent) between the electronic device 102 and the verifier device 104.

In such a case, the verifier device 104 may be configured to receive a disable command from the second electronic device 106 via the communication network 108. The disable command may be received by the verifier device 104 via the wired connection between the verifier device 104 and the second electronic device 106. The disable command may relate to the disablement of the first public key stored in the verifier device 104. Thus, the stored first public key associated with the electronic device 102 may be removed from the verifier device 104. Further, a third public key associated with the second electronic device 106 may be shared with the verifier device 104 for the setup of communication between the second electronic device 106 and the verifier device 104. Details of the disablement of the first public key are further provided, for example, in FIG. 4.

Figure 2:
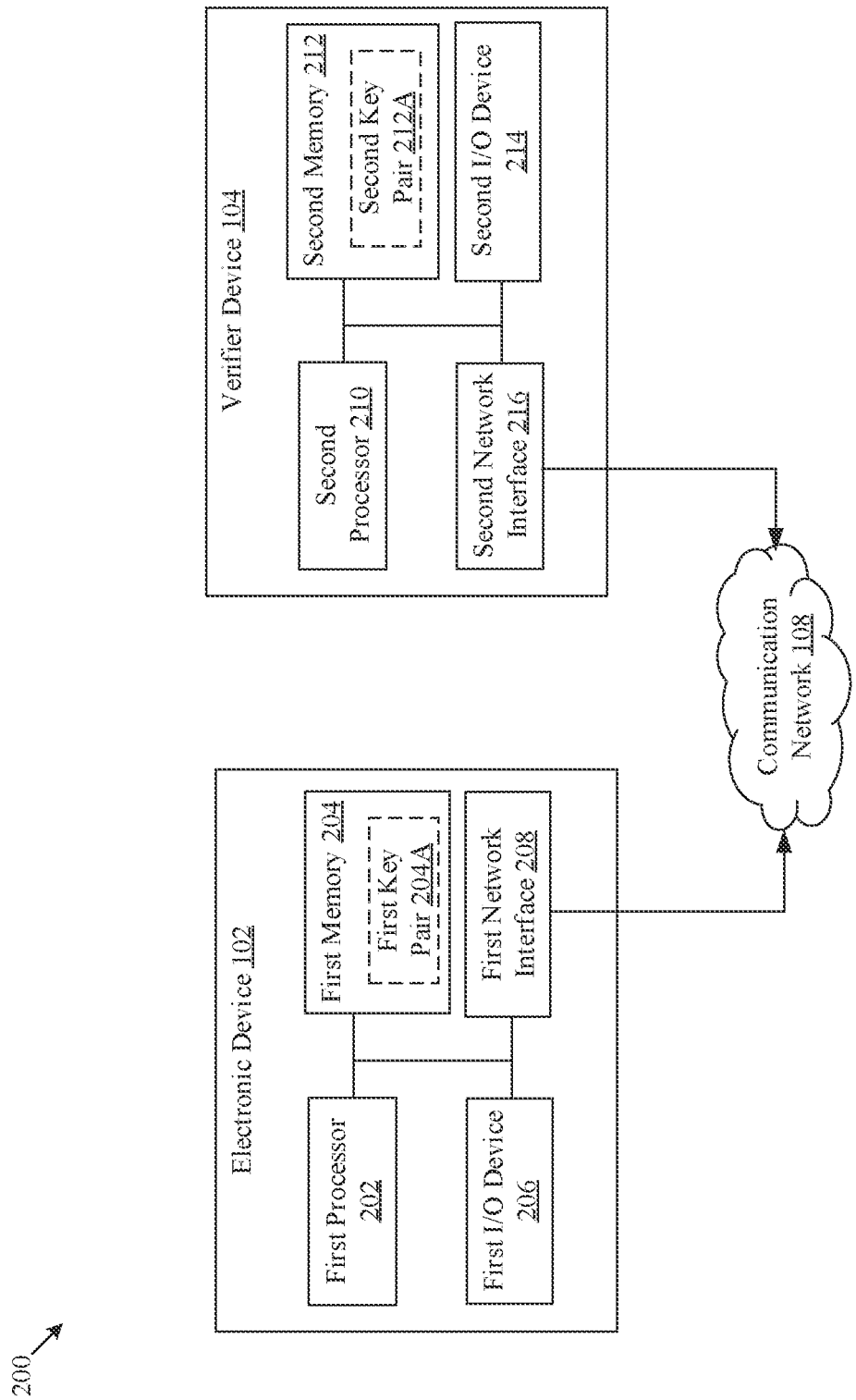
FIG. 2 is a block diagram of an electronic device and a verifier device for zero-knowledge authentication based on electronic device information, in accordance with an embodiment of the disclosure.

FIG. 2 is a block diagram of an electronic device and a verifier device for zero-knowledge authentication based on device information, in accordance with an embodiment of the disclosure. FIG. 2 is described in conjunction with elements from FIG. 1. With reference to FIG. 2, there is shown a block diagram 200. The block diagram 200 may include an electronic device 102 and a verifier device 104 communicatively coupled with a communication network 108. The electronic device 102 may further include first processor 202 and a first memory 204. The first memory 204 may include a first key pair 204A. The electronic device 102 may further include a first input/output (I/O) device 206 and a first network interface 208. The verifier device 104 may include a second processor 210 and a second memory 212.

The second memory 212 may include a second key pair 212A. The verifier device 104 may further include a second input/output (I/O) device 214 and a second network interface 216.

The first processor 202 may include suitable logic, circuitry, and interfaces that may be configured to execute a set of instructions stored in the first memory 204. The first processor 202 may be configured to execute program instructions associated with different operations to be executed by the electronic device 102. For example, some of the operations may include generation of the first key pair 204A, generation of the zero-knowledge information and transmission of the zero-knowledge information to the verifier device 104. The first processor 202 may be further configured to receive the verification information and communicate with the verifier device 104 based on the received verification information. The first processor 202 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The first memory 204 may include suitable logic, circuitry, and interfaces that may be configured to store the one or more instructions to be executed by the first processor 202. The first memory 204 may be configured to store the first key pair 204A. The first memory 204 may be further configured to store the second public key associated with and transmitted by the verifier device 104. Examples of implementation of the first memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The first key pair 204A may be a cryptographic key pair generated by the electronic device 102 for a setup of communication between the electronic device 102 and the verifier device 104. The first key pair 204A may include the first secret key and the corresponding first public key associated with the electronic device 102. The first secret key of the first key pair 204A may be undisclosed to other devices, whereas the first public key may be shared with the other devices (such as the verifier device 104) for the communication. The first secret key may be generated based on the one or more device properties of the electronic device 102, the time information and the location information of the electronic device 102. Thus, the first key pair 204A may be a unique cryptographic key pair associated with the electronic device 102.

The first I/O device 206 may include suitable logic, circuitry, and interfaces that may be configured to receive an input from a user (such as a user associated with the electronic device 102) and provide an output based on the received input. For example, the input may correspond to a request to communicate with the verifier device for the transfer of files or content between the electronic device 102 and the verifier device 104. The first I/O device 206 which may include various input and output devices, may be configured to communicate with the first processor 202. Examples of the first I/O device 206 may include, but are not limited to, a touch screen, a keyboard, a mouse, a joystick, a microphone, a display device, and a speaker.

The first network interface 208 may include suitable logic, circuitry, and interfaces that may be configured to facilitate communication between the first processor 202 and the verifier device 104, via the communication network 108. The first network interface 208 may be implemented by use of various known technologies to support wired or wireless communication of the electronic device 102 with the communication network 108. The first network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The first network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The functions of the second network interface 216 may be same as the functions of the first network interface 208 described, for example, in FIG. 2. Therefore, the description of the second network interface 216 is omitted from the disclosure for the sake of brevity.

The second processor 210 may include suitable logic, circuitry, and interfaces that may be configured to execute a set of instructions stored in the second memory 212. The second processor 210 may be configured to execute program instructions associated with different operations to be executed by the verifier device 104. For example, some of the operations may include generation of the second key pair 212A and receipt of the zero-knowledge information from the electronic device 102. The second processor 210 may be further configured to generate the verification information based on the received zero-knowledge information and transmit the verification information to the electronic device 102 for the communication between the verifier device 104 and the electronic device 102. The second processor 210 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The second memory 212 may include suitable logic, circuitry, and interfaces that may be configured to store the one or more instructions to be executed by the second processor 210. The second memory 212 may be configured to store the second key pair 212A. The second memory 212 may be further configured to store the first public key associated with and transmitted by the electronic device 102. Examples of implementation of the second memory 212 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The second key pair 212A may be a cryptographic key pair generated by the verifier device 104 for a setup of communication between the verifier device 104 and the electronic device 102. The second key pair 212A may include the second secret key and the corresponding second public key associated with the verifier device 104. The second secret key of the second key pair 212A may be undisclosed to other devices, whereas the second public key may be shared with the other devices (such as the electronic device 102) for the communication. The second secret key may be generated based on the one or more device properties of the verifier device 104, the time information and the location information of the verifier device 104. Thus, the second key pair 212A may be a unique cryptographic key pair associated with the verifier device 104.

The second I/O device 214 may include suitable logic, circuitry, and interfaces that may be configured to receive an input from a user (such as a user associated with the verifier device 104) and provide an output based on the received input. The second I/O device 214 which may include various input and output devices, may be configured to communicate with the second processor 210. Examples of the second I/O device 214 may include, but are not limited to, a touch screen, a keyboard, a mouse, a joystick, a microphone, a display device, and a speaker.

Figure 3A:
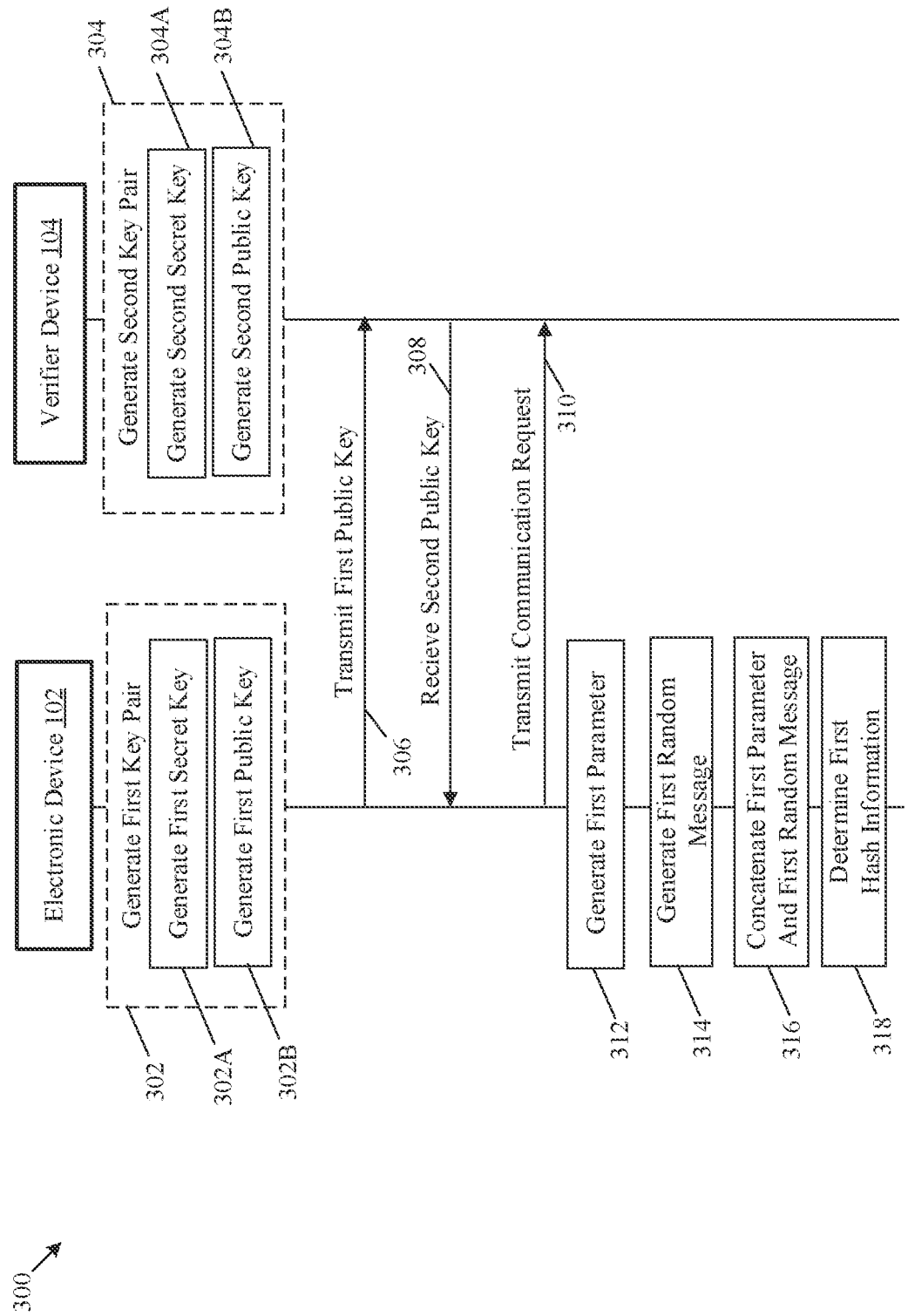
FIGS. 3A-3B collectively illustrate a sequence diagram for exemplary operations for zero-knowledge authentication based on device information, in accordance with an embodiment of the disclosure.
Figure 3B:
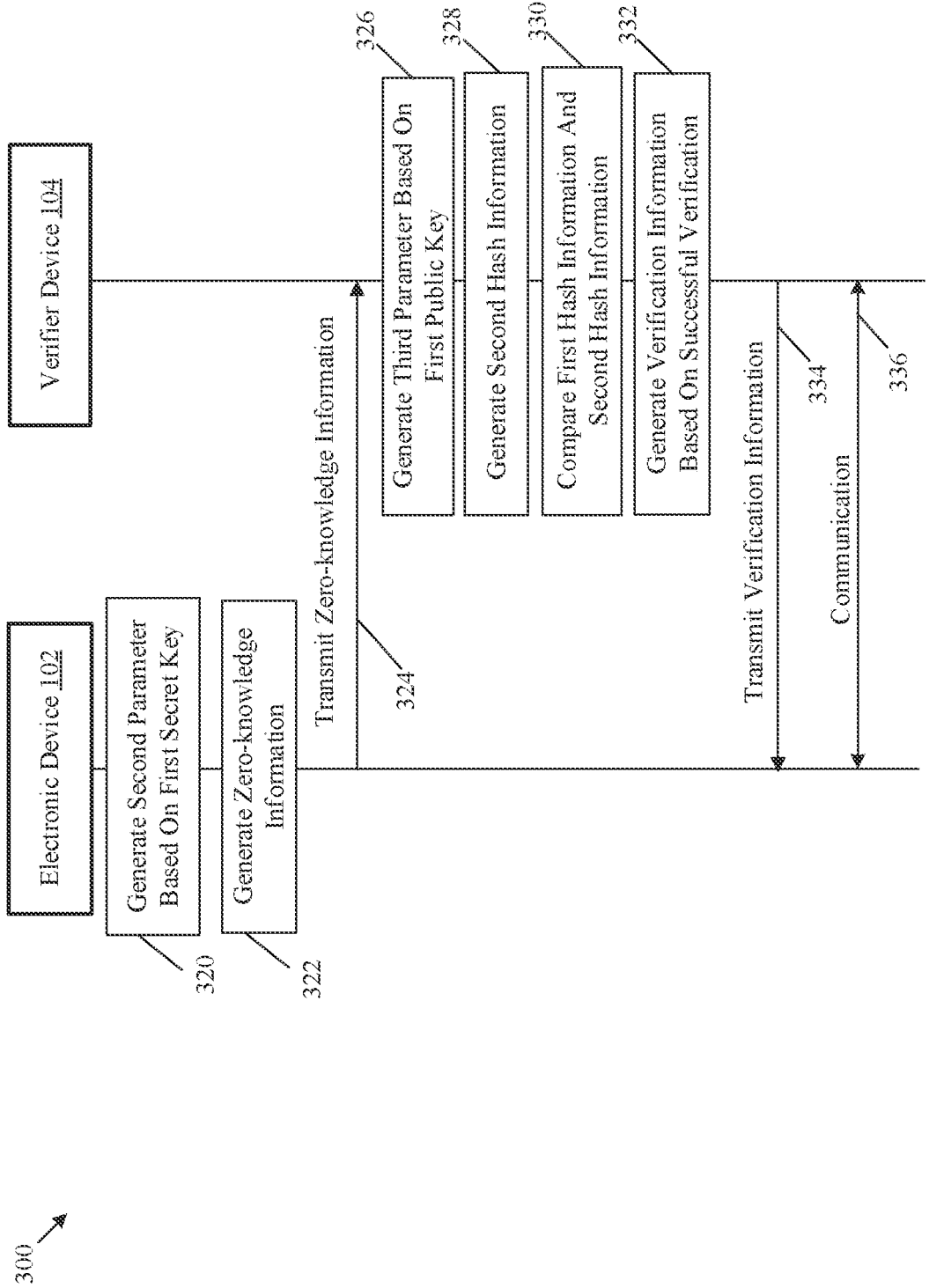

FIGS. 3A-3B collectively illustrate a sequence diagram for exemplary operations for zero-knowledge authentication based on device information, in accordance with an embodiment of the disclosure. FIGS. 3A-3B are explained in conjunction with elements from FIG. 1 and FIG. 2. With reference to FIGS. 3A-3B, there is shown a sequence diagram 300 to depict exemplary operations from 302 to 336. The exemplary operations illustrated in the sequence diagram 300 may start at 302 and may be performed by any computing system, apparatus, or device, such as by the electronic device 102 of FIG. 2 or the verifier device 104 of FIG. 2.

At 302, the first key pair 204A may be generated. In accordance with an embodiment, the first processor 202 of the electronic device 102 may be configured to generate the first key pair 204A that may include the first secret key and the first public key. At 302A, the first processor 202 may be configured to generate the first secret key of the first key pair 204A. The first secret key may be generated based on one or more device properties of the electronic device 102, the time information (i.e. timestamp) and the location information (i.e. geo-location) of the electronic device 102. The one or more device properties of the electronic device 102 may include identification information of the electronic device 102. The identification information may uniquely identify the electronic device 102. For example, the one or more device properties may include, but is not limited to, a media access control (MAC) address associated with the electronic device 102, an international mobile equipment identifier (IMEI) associated with the electronic device 102, a mobile identification number (MIN) associated with the electronic device 102, an internet protocol (IP) address associated with the electronic device 102, a unique device identifier (UDID) associated with the electronic device 102 and so forth. The generated first key pair 204A may be stored in the first memory 204 of the electronic device 102.

In some embodiments, the one or more device properties may include a unique product identifier (ID) and a firmware ID associated with the electronic device 102. Moreover, the time information (i.e. timestamp) may include information about a time and a date of the generation of the first secret key. For example, the first processor 202 may utilize the time (example, in hours, minutes, and seconds format) and date (example, in date, month, and year format) for the generation of the first secret key. The location information may include information about a place where the electronic device 102 may be present at the time of generation of the first secret key. For example, the location information may include geographical coordinates (such as latitude and longitude) of the electronic device 102. In such case, the first secret key (as a unique system ID) of the first key pair 204A may be generated based on equation (1), as follows:

$$\text{First Secret Key}=(\text{Product\_ID}+\text{Firmware\_ID})*\text{Firmware\_ID}+\text{time information}+\text{location information} \quad (1)$$

where Product_ID is the unique product identifier (ID) of the electronic device 102 and Firmware_ID is the unique firmware ID of the electronic device 102.

At 302B, the first processor 202 may be configured to generate the first public key of the first key pair 204A. In some embodiments, the first public key of the first key pair 204A may be generated based on the generated first secret key of the first key pair 204A. For example, the first public key may include the one or more device properties of the electronic device 102, the time information and the location information of the electronic device 102.

In some embodiments, the first public key may be generated based on the equation 2 as follows:

$$\text{first public key} = A^{(-\text{first secret key})} \quad (2)$$

where A is a random number.

In one or more embodiments, the first key pair 204A may be generated each time for the zero-knowledge based authentication, where the first key pair 204A may be generated based on device related information (like device properties, time information and location information) of the electronic device 102. In other embodiments, the first key pair 204A may be generated once at a beginning of a setup of the electronic device 102 and the verifier device 104.

At 304, the second key pair 212A may be generated. In accordance with an embodiment, the second processor 210 of the verifier device 104 may be configured to generate the second key pair 212A. At 304A, the second processor 210 may be configured to generate the second secret key of the second key pair 212A. The second secret key may be generated based on one or more device properties of the verifier device 104, the time information and the location information of the verifier device 104. The one or more device properties of the verifier device 104 may include identification information of the verifier device 104. For example, the one or more device properties may include, but is not limited to, the MAC address associated with the verifier device 104, the IMEI associated with the verifier device 104, the MIN associated with the verifier device 104, the IP address associated with the verifier device 104, the UDID associated with the verifier device 104 and so forth. The second key pair 212A may be stored in the second memory 212 of the verifier device 104.

In some embodiments, the one or more device properties of the verifier device 104 may include a unique product identifier (ID) and a firmware ID associated with the verifier device 104. Moreover, the time information may include a time and date of the generation of the second secret key. For example, the second processor 210 may utilize the time and date for the generation of the second secret key. The location information may include information about a place where the verifier device 104 may be present at the time of generation of the second secret key. For example, the location information may include the geographical coordinates of the verifier device 104. In such case, the second secret key (as a unique system ID) of the second key pair 212A may be generated based on equation (3), as follows:

Second Secret Key=(Product_ID+Firmware_ID)*Firmware_ID+time information+location information     (3)

where Product_ID is the unique product identifier (ID) of the verifier device 104 and Firmware_ID is the unique firmware ID of the verifier device 104.

At 304B, the second processor 210 may be configured to generate the second public key of the second key pair 212A. In some embodiments, the second public key of the second key pair 212A may be generated based on the generated second secret key of the second key pair 212A. For example, the second public key may include the one or more device properties of the verifier device 104, the time information and the location information of the verifier device 104.

In some embodiments, the second public key may be generated based on the equation 4 as follows:

$$\text{second public key}=A^{(-second\ secret\ key)} \quad (4)$$

where A is a random number.

In one or more embodiments, the second key pair 212A may be generated each time for the zero-knowledge based authentication, where the second key pair 212A may be generated based on device related information (like device properties, time information and location information) of the verifier device 104. In other embodiments, second key pair 212A may be generated once at a beginning of the setup of the electronic device 102 and the verifier device 104.

At 306, the first public key may be transmitted. In accordance with an embodiment, the first processor 202 may be configured to transmit the first public key to the verifier device 104 for a setup of the communication between the electronic device 102 and the verifier device 104. In an embodiment, the first public key may be generated once for enablement of the communication between the electronic device 102 and the verifier device 104. The first public key may be shared and stored in the verifier device 104 for the setup of the communication. Hence, the stored first public key may be utilized by the verifier device 104 each time for the verification of the electronic device 102 for enabling the secure communication between the electronic device 102 and the verifier device 104.

At 308, the second public key may be received. In accordance with an embodiment, the first processor 202 of the electronic device 102 may be configured to receive the second public key associated with the verifier device 104. The second public key may be received from the verifier device 104 for a completion of the setup of the communication between the electronic device 102 and the verifier device 104. The received second public key may be stored in the first memory 204 of the electronic device 102. The exchange of the first public key and the second public key may allow the electronic device 102 to be recognized as a trusted device for the communication by the verifier device 104.

At 310, a communication request may be transmitted. In accordance with an embodiment, the first processor 202 may be configured to transmit the communication request to the verifier device 104. The communication request may correspond to the request for communication between the electronic device 102 and the verifier device 104. In some embodiments, the first processor 202 may transmit the communication request via an application installed in the electronic device 102. In an alternate embodiment, the communication request may be transmitted by the verifier device 104. In such a case, the second processor 210 may be configured to transmit the communication request to the electronic device 102 via an application installed in the verifier device 104. The communication request may be transmitted from the electronic device 102 to access one or more files or content stored in the second memory 212 of the verifier device 104. In some embodiments, the communication request may be transmitted from the electronic device 102 to share one or more files or content with the verifier device 104.

At 312, a first parameter may be generated for the generation of the zero-knowledge information. In accordance with an embodiment, the first processor 202 may be configured to generate the first parameter of a first set of randomized parameters. The first processor 202 may determine one or more random numbers for the generation of the first parameter of the first set of randomized parameters. For example, the first processor 202 may determine a random number "P" of the one or more random numbers which may be a prime number. The first processor 202 may further determine a random number "Q" which may be a factor of the random number "P−1". Furthermore, the first processor 202 may determine a random number "A" based on equation (5), as follows:

$$A^Q=1*\mathrm{mod}(P) \quad (5)$$

where "mod" represents a modulus operator on the random number "P".

The first processor 202 may further determine a random number "r", such that r lies between 0 and the random number "Q". The first processor 202 may generate the first parameter, such as a first parameter "X" based on equation (6), as follows:

$$X=A^r*\mathrm{mod}(P) \quad (6)$$

Thus, the first processor 202 may determine the one or more random numbers "P", "Q", "A" and "r" for the determination of the first parameter "X" of the first set of randomized parameters.

At 314, a first random message may be generated. In accordance with an embodiment, the first processor 202 may be configured to generate the first random message of the first set of randomized parameters associated with the electronic device 102. In some embodiments, the first processor 202 may generate the first random message, such as a first random message "M" of the first set of randomized parameters that may include random alphanumeric characters. Moreover, the electronic device 102 and the verifier device 104 may agree upon the random number "P", the random number "Q", and the random number "A" during the setup of communication between the electronic device 102 and the verifier device 104.

At 316, the generated first parameter and the generated first random message of the first set of randomized parameters may be concatenated. In accordance with an embodiment, the first processor 202 may be configured to concatenate the generated first parameter "X" and the generated first random message "M" of the first set of randomized parameters. The generated first parameter and the generated first random message may be concatenated to increase a randomness of the zero-knowledge information.

At 318, the first hash information may be determined. In accordance with an embodiment, the first processor 202 may be configured to determine the first hash information based on an application of a first hash function on the first set of randomized parameters, such as the first parameter "X" and the first random message "M". For example, the first hash information, such as first hash information "e" may be determined based on equation (7), as follows:

$$e=\text{hash}(X\|M) \quad (7)$$

where hash is the first hash function applied on the first parameter "X" and the first random message "M".

The first hash information "e" may include irreversible hash information. In some embodiments, the first processor 202 may be configured to determine the first hash information based on the application of the first hash function on the concatenated the first parameter "X" and the first random message "M" of the first set of randomized parameters.

At 320, the second parameter may be generated. In accordance with an embodiment, the first processor 202 may be configured to generate the second parameter of the first set of randomized parameters based on the determined first hash information "e", the first secret key and the determined one or more random numbers (such as random number "r"). For example, the second parameter, such as a second parameter "Y" may be generated based on equation (8), as follows:

$$Y=(r+\text{first secret key}*e)\bmod(Q) \quad (8)$$

Thus, the first processor 202 of the electronic device 102 may be configured to generate the second parameter "Y" of the first set of randomized parameters based on the random number "r", the first secret key associated with the electronic device 102, the first hash information "e", and the random number "Q". The second parameter "Y" may include irreversible and random entities, therefore, the first secret key may be indeterminable by any other device even when the second parameter "Y" is known. Therefore, the first set of randomized parameters generated by the first processor 202 may include the first parameter "X", the first random message "M", the first hash information "e" and the second parameter "Y".

At 322, the zero-knowledge information may be generated. In accordance with an embodiment, the first processor 202 of the electronic device 102 may be configured to generate the zero-knowledge information based on the generated first secret key, the determined first hash information "e", the generated first random message "M", and the generated second parameter "Y" that is generated based on the first secret key associated with the electronic device 102. The generated zero-knowledge information may be a zero-knowledge cryptographic proof generated by the first processor 202, such that the first secret key of the first key pair 204A may be indeterminable by the verifier device 104. The generated zero-knowledge information may include irreversible hash information, such as the first hash information "e" and the second parameter "Y" that may include the irreversible entities that may enhance security of the electronic device 102. The zero-knowledge information may be as follows:

$$\text{zero-knowledge information}=(M,e,Y)$$

At 324, the generated zero-knowledge information may be transmitted. In accordance with an embodiment, the first processor 202 may be configured to transmit the zero-knowledge information to the verifier device 104 for a verification of the transmitted communication request. The generated zero-knowledge information may be transmitted to the verifier device 104 via the communication network 108. The zero-knowledge information may be transmitted as:

$$\text{send}(M,e,Y)$$

The verification of the transmitted communication request may be based on the first public key, associated with the electronic device 102 and stored in the verifier device 104. Thus, the electronic device 102 may be authenticated based on the zero-knowledge information without revelation of the first secret key of the first key pair 204A (or any other password) to the verifier device 104. Thus, the privacy of the electronic device 102 may be maintained. The first secret key may be indeterminable even when the transmitted zero-knowledge information may get leaked to a third party with malicious intent.

At 326, the third parameter may be generated. In accordance with an embodiment, the second processor 210 of the verifier device 104 may be configured to generate the third parameter of the first set of randomized parameters based on the second parameter "Y" received from the electronic device 102, the first public key associated with the electronic device 102, and the received first hash information "e". The verifier device 104 receives the zero-knowledge information that may include the first random message "M", the first hash information "e" and the second parameter "Y". Therefore, the verifier device 104 may have information related to the first random message "M", the random number "P", the random number "Q" and the random number "A". For example, the verifier device 104 may generate the third parameter, such as a third parameter "X'" based on equation (9), as follows:

$$X'=A^{Y}*(\text{first public key})^{e}*\bmod(p) \quad (9)$$

Further, as the first public key may be depicted as:

$$\text{first public key}=A^{(-\text{first secret key})}$$

Thus, the third parameter "X'" may be depicted as:

$$X'=A^{(Y-e*\text{first secret key})}*\bmod(p)$$

As the second parameter "Y"=(r+e*first secret key), thus, the third parameter "X'" may be generated as:

$$X'=A^{r}*\bmod(p)$$

The verifier device 104 may generate the third parameter "X'" based on the transmitted zero-knowledge information by the electronic device 102.

At 328, the second hash information may be generated. In accordance with an embodiment, the second processor 210 of the verifier device 104 may be configured to generate the second hash information based on the application of the second hash function on the generated third parameter "X'" of the first set of randomized parameters and the first random message "M" included in the received zero-knowledge information. The second processor 210 of the verifier device 104 may further generate the second hash information, such as second hash information "e'". The verifier device 104 may generate the second hash information "e'" based on the application of the second hash function based on equation (10), as follows:

$$e'=\text{hash}(M\|X') \quad (10)$$

where hash is the second hash function applied on the generated third parameter "X'" and the first random message "M".

The verifier device 104 may generate the second hash information "e'" based on the known first public key (i.e. based on which the third parameter is calculated) of the electronic device 102 and the information related to the first secret key included in the second parameter "Y" received in the zero-knowledge information. In some embodiments, the third parameter and the first random message "M" may be concatenated and the second hash function may be applied on the concatenated third parameter and the first random message "M" to generate the second hash information "e'", as shown in equation (10).

At 330, the first hash information "e" and the second hash information "e'" may be compared. In accordance with an embodiment, the second processor 210 of the verifier device 104 may be configured to compare the first hash information "e" included in the received zero-knowledge information and the second hash information "e'". The comparison of the first hash information "e" and the second hash information "e'" may be performed for a recovery of the first public key from the zero-knowledge information to verify the identity of the electronic device 102.

At 332, the verification information may be generated. In accordance with an embodiment, the second processor 210 of the verifier device 104 may be configured to generate the verification information based on the comparison. In an embodiment, the second processor 210 of the verifier device 104 may be configured to generate the verification information based on the transmitted zero-knowledge information and a successful verification of the verification of the transmitted communication request. In some embodiments, the generation of the verification information or the successful verification may indicate that the received first hash information "e" and the generated second hash information "e'" are same. The generation of the verification information may indicate a successful recovery of the first public key from the zero-knowledge information, thereby assuring authenticity of the electronic device 102. Thus, the similarity between the first hash information "e" and the second hash information "e'", may indicate that the stored first public key of the electronic device 102 and the recovered public key from the zero-knowledge information are the same. In an embodiment, in case of mismatch between the received first hash information "e" and the generated second hash information "e'", the second processor 210 of the verifier device 104 may not generate the verification information and may deny the permission to the electronic device 102 to access the verifier device 104 or communicate with the verifier device 104.

At 334, the verification information may be transmitted. In accordance with an embodiment, the second processor 210 of the verifier device 104 may be configured to transmit the verification information to the electronic device 102. The transmission of the verification information to the electronic device 102 may provide permission to the electronic device 102 for establishment of the communication between the electronic device 102 and the verifier device 104 based on the successful verification of the verification of the transmitted communication request. Thus, the password-less authentication of the electronic device 102 may be provided based on the zero-knowledge information generated by the electronic device 102.

At 336, the communication may be provided. In accordance with an embodiment, the first processor 202 of the electronic device 102 and the second processor 210 of the verifier device 104 may communicate with each other based on successful verification of the identity of the electronic device 102. In other words, the first processor 202 may communicate with the second processor 210 of the verifier device 104 based on the received verification information. The electronic device 102 may communicate with the verifier device 104 to share one or more files or contents with the verifier device 104 or to access one or more files or contents stored in the verifier device 104. Thus, the verifier device 104 may utilize the first public key of the electronic device 102 and the zero-knowledge information generated by the electronic device 102 for the successful verification of the identity of the electronic device 102. In some embodiments, the electronic device 102 may generate a different zero-knowledge information each time when the communication request is transmitted to share or access files/contents. Thus, the zero-knowledge information may be utilized by the verifier device 104 only once after the receipt of the communication request from the electronic device 102. Therefore, the electronic device 102 may utilize the zero-knowledge information based authentication for a secure, reliable, and password-less verification of the electronic device 102. In an embodiment, for each communication session between the electronic device 102 and the verifier device 104, the zero-knowledge information may be generated and utilized for the authentication of the electronic device 102 with the verifier device 104.

Although the sequence diagram 300 is illustrated as discrete operations, such as 302, 304, 306, 308, 310, 312, 314, 316, 318, 320, 322, 324, 326, 328, 330, 332, 334, and 336, however, in certain embodiments, such discrete operations may be further divided into additional operations, combined into fewer operations, or eliminated, depending on the particular implementation without detracting from the essence of the disclosed embodiments.

Figure 4:
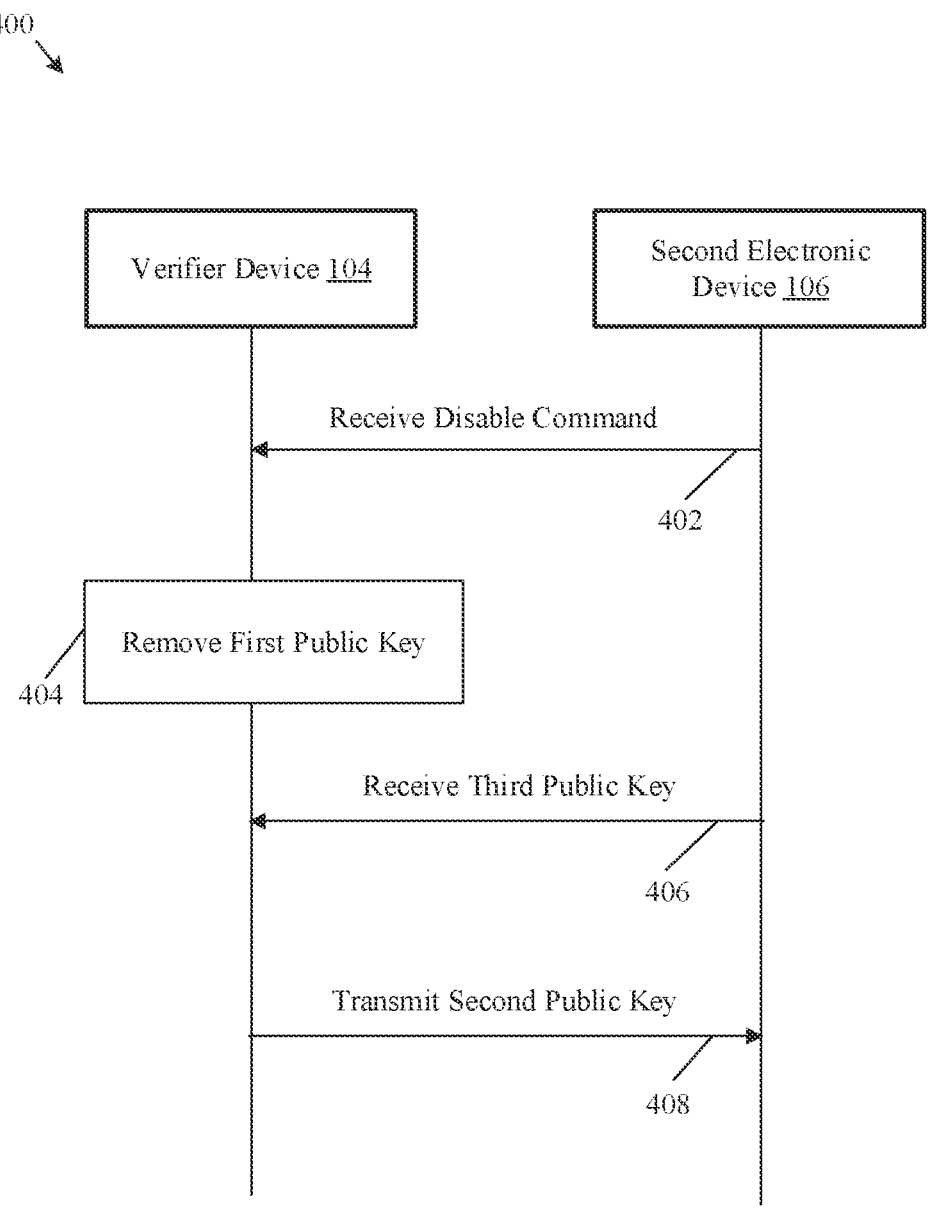
FIG. 4 is a sequence diagram that illustrates exemplary operations for key disablement based on communication with a second electronic device, in accordance with an embodiment of the disclosure.

FIG. 4 is a sequence diagram that illustrates exemplary operations for key disablement based on communication with a second electronic device, in accordance with an embodiment of the disclosure. FIG. 4 is explained in conjunction with elements from FIGS. 1, 2, 3A, and 3B. With reference to FIG. 4, there is shown a sequence diagram 400 to depict exemplary operations from 402 to 408. The exemplary operations illustrated in the sequence diagram 400 may start at 402 and may be performed by any computing system, apparatus, or device, such as by the verifier device 104 or the second processor 210 of FIG. 2.

At 402, the disable command may be received. In accordance with an embodiment, the second processor 210 of the verifier device 104 may be configured to receive a disable command from the second electronic device 106. For example, the disable command may be received via a wired connection (such as via a universal serial bus (USB) connection) between the second electronic device 106 and the verifier device 104. In an exemplary scenario, the electronic device 102 may become inoperable due to damage (such as software related damage or hardware related damage) caused to the electronic device 102. In another scenario, the electronic device 102 may be lost or stolen. In such cases, the second electronic device 106 (for example a new electronic device) may be utilized to avoid misuse of the lost electronic device 102 during an establishment of the communication with the verifier device 104 by the third party. In an example, the electronic device 102 and the second electronic device 106 may be associated with a common user or owner. The received disable command may relate to disablement of the first public key of the electronic device 102 stored in the verifier device 104. In some embodiments, the disable command may be received from the second electronic device 106 via an application stored in the second electronic device 106. The receipt of the disable command via the wired connection from the second electronic device 106 may ensure that the disablement of the first public key of the electronic device 102 may be performed by a reliable user who has access to the verifier device 104. Thus, a risk of access of the verifier device 104 by a miscreant may be avoided.

At 404, the first public key may be removed. In accordance with an embodiment, the second processor 210 of the verifier device 104 may be configured to remove the first public key associated with the electronic device 102 from the second memory 212 of the verifier device 104, based on the disable command received from the second electronic device 106. Therefore, the electronic device 102 may no longer be identified as a trusted device by the verifier device 104. Based on the removal of the first public key from the verifier device 104, the unauthorized communication of the electronic device 102 with the verifier device 104 may be avoided. Thus, the verifier device 104 may provide security to files/contents related to the electronic device 102 and stored in the verifier device 104, even when the electronic device 102 becomes inoperable or is lost.

At 406, a third public key may be received. In accordance with an embodiment, the second processor 210 of the verifier device 104 may be configured to receive the third public key of a third key pair associated with the second electronic device 106 for a setup of the communication between the verifier device 104 and the second electronic device 106. The third public key of the third key pair may be received via the communication network 108. For example, the third public key may be received via the wired connection between the second electronic device 106 and the verifier device 104. The receipt of the third public key may allow the second electronic device 106 to be recognized as a trusted device by the verifier device 104 in future. In an embodiment, the second electronic device 106 may generate the third public key as the electronic device 102 generates the first key pair 204A, as described, for example, for example, at 302 in FIG. 3A.

At 408, the second public key may be transmitted. In accordance with an embodiment, the second processor 210 may be configured to transmit the second public key associated with the verifier device 104 to the second electronic device 106 for a completion of the setup of the communication between the verifier device 104 and the second electronic device 106. The exchange of the second public key of the second key pair 212A and the third public key of the third key pair may allow the completion of the setup of communication between the verifier device 104 and the second electronic device 106. The third public key may further be stored in the second memory 212 of the verifier device 104 for the authentication of the second electronic device 106 based on zero-knowledge information received from the second electronic device 106. In some embodiments, the verifier device 104 may generate the second key pair 212A for the setup of communication with the second electronic device 106.

Although the sequence diagram 400 is illustrated as discrete operations, such as 402, 404, 406, and 408, however, in certain embodiments, such discrete operations may be further divided into additional operations, combined into fewer operations, or eliminated, depending on the particular implementation without detracting from the essence of the disclosed embodiments.

Figure 5:
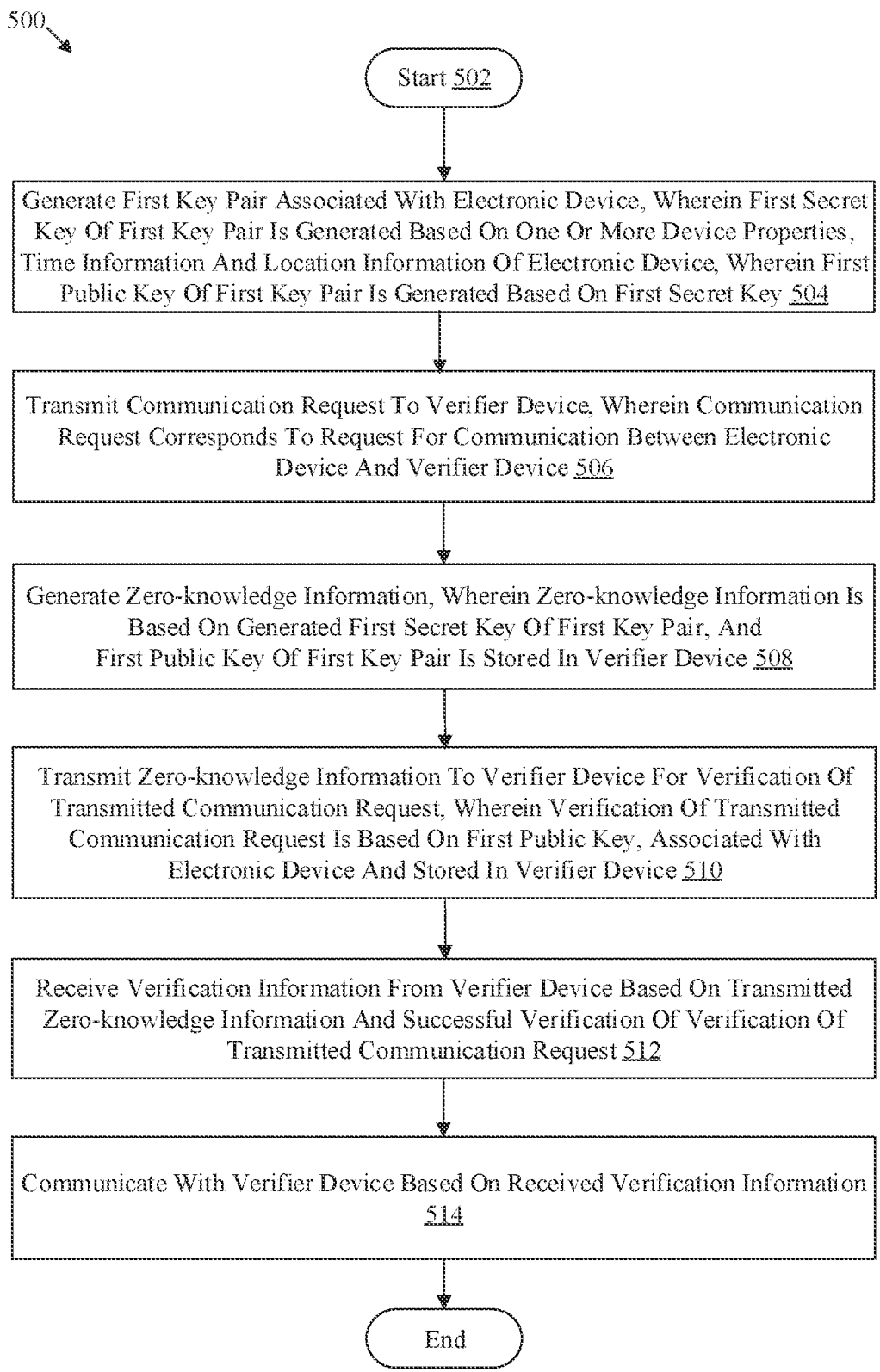
FIG. 5 is a flowchart that illustrates an exemplary method for zero-knowledge authentication based on device information, performed by an electronic device, in accordance with an embodiment of the disclosure.

FIG. 5 is a flowchart that illustrates an exemplary method for zero-knowledge authentication based on device information, performed by an electronic device, in accordance with an embodiment of the disclosure. FIG. 5 is described in conjunction with elements from FIGS. 1, 2, 3A-3B, and 4. With reference to FIG. 5, there is shown a flowchart 500. The exemplary method of the flowchart 500 may be executed by any computing system, for example, by the electronic device 102 of FIG. 1 or the first processor 202 in FIG. 2. The exemplary method of the flowchart 500 may start at 502 and proceed to 504.

At 504, the first key pair 204A associated with the electronic device 102 may be generated. In accordance with an embodiment, the first processor 202 of the electronic device 102 may be configured to generate the first key pair 204A associated with the electronic device 102. The first secret key of the first key pair 204A may be generated based on the one or more device properties (i.e. including identification information of the electronic device 102), the time information and the location information of the electronic device 102. The first public key of the first key pair 204A may be further generated based on the first secret key of the first key pair 204A. The generation of the first key pair 204A is described, for example, in FIGS. 3A-3B at 302.

At 506, the communication request may be transmitted to the verifier device 104. In accordance with an embodiment, the first processor 202 of the electronic device 102 may be configured to transmit the communication request to the verifier device 104. The communication request may respond to the request for communication between the electronic device 102 and the verifier device 104. The transmission of the communication request is described, for example, in FIGS. 3A-3B at 310.

At 508, the zero-knowledge information may be generated. In accordance with an embodiment, the first processor 202 may be configured to generate the zero-knowledge information. The zero-knowledge information may be generated based on the first secret key of the first key pair 204A associated with the electronic device 102. The first public key of the first key pair 204A may be stored in the verifier device 104. The generation of the zero-knowledge information is described, for example, in FIGS. 3A-3B at 312-322.

At 510, the zero-knowledge information may be transmitted. In some embodiments, the first processor 202 may be configured to transmit the zero-knowledge information to the verifier device 104 for the verification of the transmitted communication request. The verification of the transmitted communication request may be based on the first public key of the first key pair associated with the electronic device 102 and stored in the verifier device 104. The transmission of the zero-knowledge information is described, for example, in FIGS. 3A-3B at 324.

At 512, the verification information may be received. In accordance with an embodiment, the first processor 202 may be configured to receive the verification information from the verifier device 104 based on the transmitted zero-knowledge information and the successful verification of the verification of the transmitted communication request. The generation and receipt of the verification information is described, for example, in FIGS. 3A-3B at 326-334.

At 514, the electronic device 102 may communicate with the verifier device 104. In accordance with an embodiment, the first processor 202 may be configured to communicate with the verifier device 104 based on the received verification information. The communication of the electronic device 102 and the verifier device 104 is described, for example, in FIGS. 3A-3B at 336. Control may pass to end.

Although the flowchart 500 illustrates discrete operations, such as 504, 506, 508, 510, 512, and 514 the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 6:
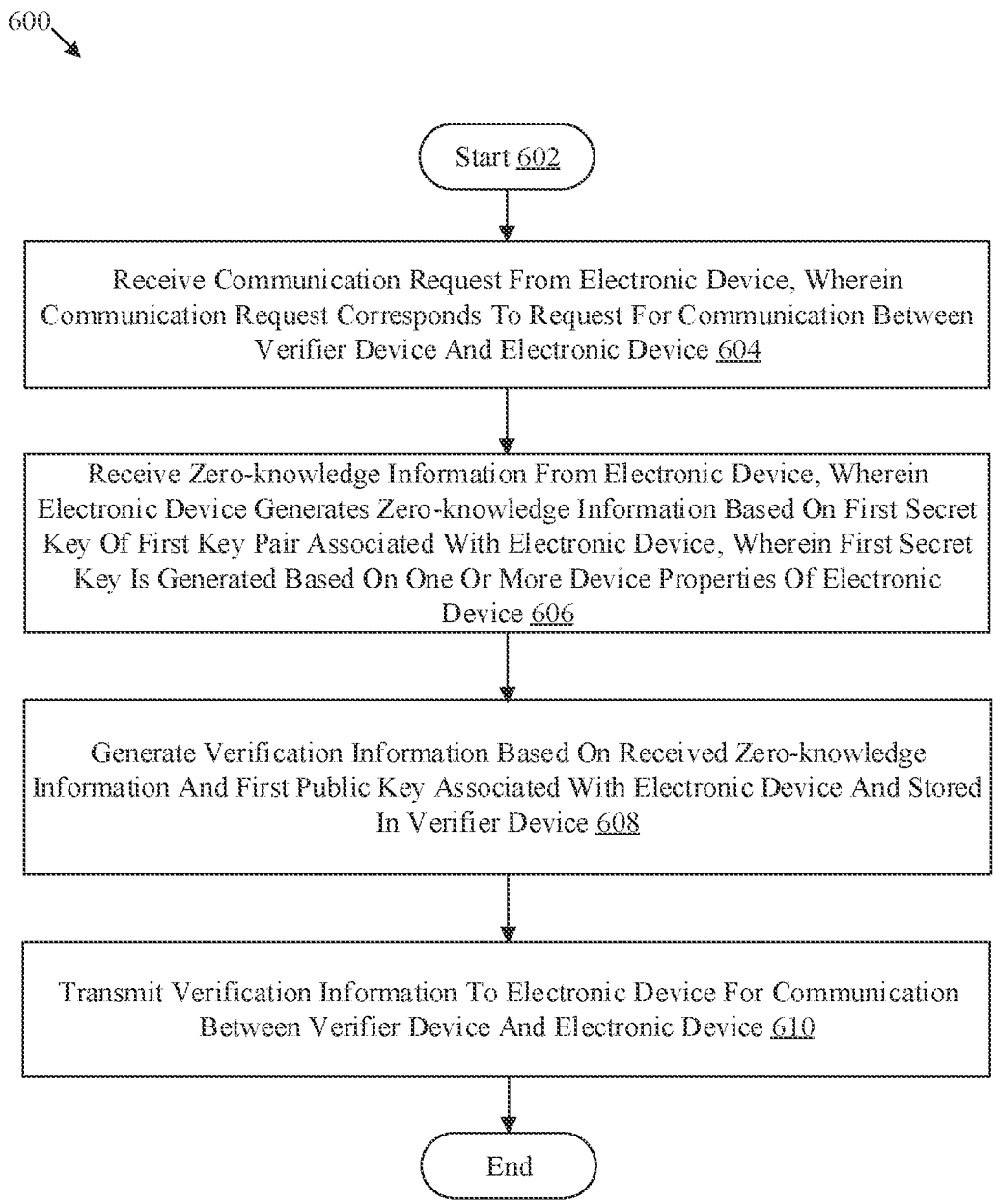
FIG. 6 is a flowchart that illustrates an exemplary method for zero-knowledge authentication performed by a verifier device, in accordance with an embodiment of the disclosure.

FIG. 6 is a flowchart that illustrates an exemplary method for zero-knowledge authentication performed by a verifier device, in accordance with an embodiment of the disclosure. FIG. 6 is described in conjunction with elements from FIGS. 1, 2, 3A-3B, 4 and 5. With reference to FIG. 6, there is shown a flowchart 600. The exemplary method of the flowchart 600 may be executed by any computing system, for example, by the verifier device 104 of FIG. 1 or the second processor 210 in FIG. 2. The exemplary method of the flowchart 600 may start at 602 and proceed to 604.

At 604, the communication request may be received. In accordance with an embodiment, the second processor 210 of the verifier device 104 may be configured to receive the communication request from the electronic device 102. The communication request may correspond to the request for communication between the verifier device 104 and the electronic device 102. The receipt of the communication request is described, for example, in FIGS. 3A-3B at 310.

At 606, the zero-knowledge information may be received from the electronic device 102. In accordance with an embodiment, the second processor 210 may be configured to receive the zero-knowledge information received from the electronic device 102. The electronic device 102 may generate the zero-knowledge information based on the first secret key of the first key pair 204A associated with the electronic device 102. The first secret key of the first key pair 204A may be generated based on the one or more device properties (i.e. including identification information of the electronic device 102), the time information and the location information of the electronic device 102. The generation and receipt of the zero-knowledge information is described, for example, in FIGS. 3A-3B at 312-324.

At 608, the verification information may be generated. In some embodiments, the second processor 210 may be configured to generate the verification information based on the received zero-knowledge information and the first public key associated with the electronic device 102 and stored in the verifier device 104. In accordance with an embodiment, the verification information may indicate that the received first hash information and the generated second hash information are the same. The generation of the verification information is described, for example, in FIGS. 3A-3B at 326-332.

At 610, the generated verification information may be transmitted to the electronic device 102. In accordance with an embodiment, the second processor 210 may be configured to transmit the generated verification information to the electronic device 102 for the communication between the verifier device 104 and the electronic device 102. The transmission of the generated verification information is described, for example, in FIGS. 3A-3B at 324. Control may pass to end.

Although the flowchart 600 illustrates discrete operations, such as 604, 606, 608, and 610 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (for example, the electronic device 102). The instructions may cause the machine and/or computer (for example, the electronic device 102) to perform operations that may include generation of a first key pair associated with the electronic device, where a first secret key of the first key pair is generated based on one or more device properties including identification information of the electronic device. The operations further include transmission of a communication request to a verifier device (such as the verifier device 104). The communication request may correspond to a request for communication between the electronic device and the verifier device. The operations may further include generation of zero-knowledge information. The zero-knowledge information may be generated based on a first secret key of a first key pair associated with the electronic device. The first public key of the first key pair may be stored in the verifier device. The operations may further include transmission of the zero-knowledge information to the verifier device for a verification of the transmitted communication request. The verification of the transmitted communication request may be based on a public key of the first key pair associated with the electronic device and stored in the verifier device. The operations may further include reception of verification information from the verifier device based on the transmitted zero-knowledge information and a successful verification of the transmitted communication request. The operations may further include communication with the verifier device based on the received verification information.

Various embodiments of the disclosure may provide a non-transitory computer readable medium and/or storage medium having stored thereon, instructions executable by a machine and/or a computer (for example, the verifier device 104). The instructions may cause the machine and/or computer (for example, the verifier device 104) to perform operations that may include reception of a communication request from an electronic device (such as the electronic device 102). The communication request may correspond to a request for communication between the verifier device and the electronic device. The operations may further include reception of zero-knowledge information from the electronic device. The electronic device may generate the zero-knowledge information based on a first secret key of a first key pair associated with the electronic device. The first secret key of the first key pair may be generated based on one or more device properties including identification information of the electronic device. The operations may further include generation of verification information based on the received zero-knowledge information and a first public key associated with the electronic device and stored in the verifier device. The operations may further include transmission of the generated verification information to the electronic device for the communication between the verifier device and the electronic device.

Exemplary aspects of the disclosure may include an electronic device (such as the electronic device 102) that may include a first processor (such as the first processor 202) and a first memory (such as the first memory 204). The first processor 202 may be configured to generate a first key pair associated with the electronic device 102. A first secret key of the first key pair may be generated based on one or more device properties including identification information of the electronic device 102. The first processor 202 may be further configured to transmit a communication request to a verifier device (such as the verifier device 104). The communication request may correspond to a request for communication between the electronic device 102 and the verifier device 104. The first processor 202 may be further configured to generate zero-knowledge information. The zero-knowledge information may be based on the generated first secret key of the first key pair 204A. A first public key of the first key pair 204A may be stored in the verifier device 104. The first processor 202 may be further configured to transmit the zero-knowledge information to the verifier device 104 for a verification of the transmitted communication request. The verification of the transmitted communication request may be based on the first public key, associated with the electronic device 102 and stored in the verifier device 104. The first processor 202 may be further configured to receive verification information from the verifier device 104 based on the transmitted zero-knowledge information and a successful verification of the verification of the transmitted communication request. The first processor 202 may be further configured to communicate with the verifier device 104 based on the received verification information.

In accordance with an embodiment, the first processor 202 may be further configured to generate the first secret key of the first key pair 204A based on time information and location information related to the electronic device 202. The first processor 202 may be further configured to generate the first public key of the first key pair 204A based on the generated first secret key.

In accordance with an embodiment, the first processor 202 may be further configured to determine first hash information based on an application of a first hash function on a first set of randomized parameters. The first processor 202 may further generate the zero-knowledge information based on the determined first hash information and the first secret key associated with the electronic device 102. The first processor 202 may further transmit the determined first hash information with the generated zero-knowledge information to the verifier device 104.

In accordance with an embodiment, the verifier device 104 may generate second hash information based on an application of a second hash function on the first public key stored in the verifier device 104 and on the first set of randomized parameters included in the received zero-knowledge information. The verifier device 104 may further compare the received first hash information with the generated second hash information. The verifier device 104 may further generate the verification information based on the comparison. In accordance with an embodiment, the generation of the verification information may indicate that the received first hash information and the generated second hash information are same.

In accordance with an embodiment, the first processor 202 may be further configured to determine one or more random numbers. The first processor 202 may further generate a first parameter of the first set of randomized parameters based on the determined one or more random numbers. The first processor 202 may further determine the first hash information based on the application of the first hash function on the generated first parameter of the first set of randomized parameters.

In accordance with an embodiment, the first processor 202 may be further configured to generate a first random message of the first set of randomized parameters associated with the electronic device 102. The first processor 202 may further concatenate the generated first parameter and the generated first random message of the first set of randomized parameters. The first processor 202 may further determine the first hash information based on the application of the first hash function on the concatenated first parameter and the first random message of the first set of randomized parameters.

In accordance with an embodiment, the first processor 202 may be further configured to generate a second parameter of the first set of randomized parameters based on the determined first hash information, the first secret key and the determined one or more random numbers. The first processor 202 may further generate the zero-knowledge information based on the determined first hash information, the generated first random message, and the generated second parameter that may be based on the first secret key associated with the electronic device 102. The first processor 202 may further transmit the generated zero-knowledge information to the verifier device 104.

In accordance with an embodiment, the first processor 202 may further transmit the first public key of the first key pair 204A to the verifier device 104 for a setup of the communication between the electronic device 102 and the verifier device 104. The first processor 202 may further receive a second public key of a second key pair (such as the second key pair 212A) associated with the verifier device 104 for a completion of the setup of the communication between the electronic device 102 and the verifier device 104.

Exemplary aspects of the disclosure may include a verifier device (such as the verifier device 104) that may include a second processor (such as the second processor 210) and a second memory (such as the second memory 212). The second memory 212 may be configured to store a first public key associated with an electronic device (such as the electronic device 102). The second processor 210 may be configured to receive a communication request from the electronic device 102. The communication request may correspond to a request for communication between the verifier device 104 and the electronic device 102. The second processor 210 may further be configured to receive zero-knowledge information from the electronic device 102. The electronic device 102 may generate the zero-knowledge information based on a first secret key of a first key pair (such as the first key pair 204A) associated with the electronic device 102. The first secret key of the first key pair may be generated based on one or more device properties including identification information of the electronic device 102. The second processor 210 may further be configured to generate verification information based on the received zero-knowledge information and the stored first public key associated with the electronic device 102. The second processor 210 may further be configured to transmit the generated verification information to the electronic device 102 for the communication between the verifier device 104 and the electronic device 102.

In accordance with an embodiment, the electronic device 102 may generate the first secret key of the first key pair based on time information and location information related to the electronic device 102. The second processor 210 may be configured to receive first hash information from the electronic device 102 with the zero-knowledge information. The second processor 210 may further generate second hash information based on an application of a second hash function on the first public key stored in the verifier device 104 and on a first set of randomized parameters included in the received zero-knowledge information. Then second processor 210 may further compare the received first hash information with the generated second hash information. The second processor 210 may further generate the verification information based on the comparison. In accordance with an embodiment, generation of the verification information may indicate that the received first hash information and the generated second hash information are same.

In accordance with an embodiment, the second processor 210 may be further configured to generate a third parameter of the first set of randomized parameters based on a second parameter received from the electronic device 102, the first public key associated with the electronic device 102, and the received first hash information. The second processor 210 may further determine the second hash information based on the application of the second hash function on the generated third parameter of the first set of randomized parameters and a first random message included in the received zero-knowledge information.

In accordance with an embodiment, the second processor 210 may be further configured to generate a second key pair (such as the second key pair 212A) that may include a second secret key and a second public key based on one or more device properties of the verifier device 104. The one or more device properties of the verifier device 104 may include identification information of the verifier device 104. The second processor 210 may further transmit the second public key of the second key pair 212A to the electronic device 102 for a setup of the communication between the verifier device 104 with the electronic device 102. The second processor 210 may further receive the first public key of the first key pair 204A associated with then electronic device 102 for a completion of the setup of the communication between the verifier device 104 with the electronic device 102.

In accordance with an embodiment, the second processor 210 may be further configured to receive a disable command from a second electronic device (such as the second electronic device 106) communicatively coupled to the verifier device 104. The disable command may relate to disablement of the first public key stored in the verifier device 104. The second processor 210 may be further configured to remove the stored first public key associated with the electronic device 102 from the second memory 212 based on the received disable command from the second electronic device 106. The second processor 210 may be further configured to receive a third public key of a third key pair associated with the second electronic device 106 for a setup of the communication between the verifier device 104 and the second electronic device 106. The second processor 210 may be further configured to transmit a second public key associated with the verifier device 104 to the second electronic device 106 device for a completion of the setup of the communication between the verifier device 104 and the second electronic device 106.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
    a processor configured to:
        generate a first key pair associated with the electronic device, wherein
            a secret key of the first key pair is generated based on time information, location information, and at least one device property including identification information of the electronic device, and
            the time information indicates a date and a time of the generation of the secret key;
        transmit a communication request to a verifier device, wherein the communication request corresponds to a request for communication between the electronic device and the verifier device;
        determine at least one random number;
        generate a first parameter of a set of randomized parameters based on the determined at least one random number;
        generate a random message of the set of randomized parameters associated with the electronic device;
        concatenate the generated first parameter and the generated random message;
        determine first hash information based on application of a first hash function on the concatenated first parameter and the generated random message;
        generate first zero-knowledge information, wherein
            the first zero-knowledge information is based on the generated secret key of the first key pair, the generated random message, and the first hash information, and
            a first public key of the first key pair is stored in the verifier device;
        transmit the first zero-knowledge information to the verifier device for a verification of the transmitted communication request, wherein the verification of the transmitted communication request is based on the first public key associated with the electronic device and stored in the verifier device;
        receive verification information from the verifier device based on the transmitted first zero-knowledge information and a successful verification of the verification of the transmitted communication request; and
        communicate with the verifier device based on the received verification information.

2. The electronic device according to claim 1, wherein the processor is further configured to generate the first public key of the first key pair based on the generated secret key.

3. The electronic device according to claim 1, wherein the processor is further configured to:
    determine the first hash information based on an application of the first hash function on the set of randomized parameters; and transmit the determined first hash information with the generated first zero-knowledge information to the verifier device.

4. The electronic device according to claim 3, wherein the verifier device
generates second hash information based on an application of a second hash function on the first public key stored in the verifier device and on the set of randomized parameters included in the transmitted first zero-knowledge information;
compares the received first hash information with the generated second hash information; and
generates the verification information based on the comparison.

5. The electronic device according to claim 4, wherein the generation of the verification information indicates that the received first hash information and the generated second hash information are same.

6. The electronic device according to claim 1, wherein the processor is further configured to:
generate a second parameter of the set of randomized parameters based on the determined first hash information, the secret key and the determined at least one random number;
generate second zero-knowledge information based on the determined first hash information, the generated random message, and the generated second parameter that is based on the secret key associated with the electronic device; and
transmit the generated second zero-knowledge information to the verifier device.

7. The electronic device according to claim 1, wherein the processor is further configured to:
transmit the first public key of the first key pair to the verifier device for a setup of the communication between the electronic device and the verifier device; and
receive a second public key of a second key pair associated with the verifier device for completion of the setup of the communication between the electronic device and the verifier device.

8. A method, comprising:
in an electronic device:
generating a first key pair associated with the electronic device, wherein
a secret key of the first key pair is generated based on time information, location information, and at least one device property including identification information of the electronic device, and
the time information indicates a date and a time of the generation of the secret key;
transmitting a communication request to a verifier device, wherein the communication request corresponds to a request for communication between the electronic device and the verifier device;
determining at least one random number;
generating a first parameter of a set of randomized parameters based on the determined at least one random number;
generating a random message of the set of randomized parameters associated with the electronic device;
concatenating the generated first parameter and the generated random message;
determining first hash information based on application of a first hash function on the concatenated first parameter and the generated random message;
generating first zero-knowledge information, wherein the first zero-knowledge information is based on the generated secret key of the first key pair associated with the electronic device, the generated random message, and the first hash information, and
a first public key of the first key pair is stored in the verifier device;
transmitting the first zero-knowledge information to the verifier device for a verification of the transmitted communication request, wherein the verification of the transmitted communication request is based on the first public key of the first key pair associated with the electronic device and stored in the verifier device;
receiving verification information from the verifier device based on the transmitted first zero-knowledge information and a successful verification of the verification of the transmitted communication request; and
communicating with the verifier device based on the received verification information.

9. The method according to claim 8, wherein
the first public key of the first key pair is generated based on the generated secret key.

10. The method according to claim 8, further comprising:
determining the first hash information based on an application of the first hash function on the set of randomized parameters; and
transmitting the determined first hash information with the generated first zero-knowledge information to the verifier device.

11. The method according to claim 10, further comprising:
determining the first hash information based on the application of the first hash function on the generated first parameter of the set of randomized parameters.

12. A verifier device, comprising:
a processor; and
a memory configured to store a first public key associated with a first electronic device, wherein the processor is configured to:
receive a communication request from the first electronic device, wherein the communication request corresponds to a request for communication between the verifier device and the first electronic device;
receive zero-knowledge information from the first electronic device, wherein
the first electronic device generates the zero-knowledge information based on a first secret key of a first key pair associated with the first electronic device, a random message, and a first hash information,
the random message is generated from a set of randomized parameters associated with the first electronic device,
the first secret key of the first key pair is generated based on time information, location information, and at least one device property including identification information of the first electronic device,
the time information indicates a date and a time of the generation of the secret key, and
the first hash information is determined based on concatenation of a first parameter and the random message;
generate verification information based on the received zero-knowledge information and the stored first public key associated with the first electronic device; and transmit the generated verification information to the first electronic device for the communication between the verifier device and the first electronic device.

13. The verifier device according to claim 12, wherein the processor is further configured to:
receive first hash information from the first electronic device with the zero-knowledge information;
generate second hash information based on an application of a second hash function on the first public key stored in the verifier device and on the set of randomized parameters included in the received zero-knowledge information;
compare the received first hash information with the generated second hash information; and
generate the verification information based on the comparison, wherein the generation of the verification information indicates that the received first hash information and the generated second hash information are same.

14. The verifier device according to claim 13, wherein the processor is further configured to:
generate a third parameter of the set of randomized parameters based on a second parameter received from the first electronic device, the first public key associated with the first electronic device, and the received first hash information; and
generate the second hash information based on the application of the second hash function on the generated third parameter of the set of randomized parameters and the random message included in the received zero-knowledge information.

15. The verifier device according to claim 12, wherein the processor is further configured to:
generate a second key pair that includes a second secret key and a second public key based on at least one device property of the verifier device, wherein the at least one device property of the verifier device includes identification information of the verifier device;
transmit the second public key of the second key pair to the first electronic device for a setup of the communication between the verifier device with the first electronic device; and
receive the first public key of the first key pair associated with the first electronic device for completion of the setup of the communication between the verifier device with the first electronic device.

16. The verifier device according to claim 12, wherein the processor is further configured to:
receive a disable command from a second electronic device communicatively coupled to the verifier device, wherein the disable command relates to disablement of the first public key stored in the verifier device;
remove the stored first public key associated with the first electronic device from the memory based on the received disable command from the second electronic device;
receive a third public key of a third key pair associated with the second electronic device for a setup of the communication between the verifier device and the second electronic device; and
transmit a second public key associated with the verifier device to the second electronic device for completion of the setup of the communication between the verifier device and the second electronic device.

17. A method, comprising:
in a verifier device:
receiving a communication request from an electronic device, wherein the communication request corresponds to a request for communication between the verifier device and the electronic device;
receiving zero-knowledge information from the electronic device, wherein
the electronic device generates the zero-knowledge information based on a first secret key of a first key pair associated with the electronic device, a random message, and a first hash information,
the random message is generated from a set of randomized parameters associated with the electronic device,
the first secret key of the first key pair is generated based on time information, location information, and at least one device property including identification information of the electronic device,
the time information indicates a date and a time of the generation of the secret key, and
the first hash information is determined based on concatenation of a first parameter and the random message;
generating verification information based on the received zero-knowledge information and a first public key associated with the electronic device and stored in the verifier device; and
transmitting the generated verification information to the electronic device for the communication between the verifier device and the electronic device.

18. The method according to claim 17, further comprising:
receiving the first hash information from the electronic device with the zero-knowledge information;
generating second hash information based on an application of a second hash function on the first public key stored in the verifier device and on the set of randomized parameters included in the received zero-knowledge information;
comparing the received first hash information with the generated second hash information; and
generating the verification information based on the comparison.

19. The method according to claim 18, wherein the verification information indicates that the received first hash information and the generated second hash information are same.

* * * * *